May 16, 1933.  T. FOON  1,909,462
ASPARAGUS GRADER
Filed July 31, 1929   2 Sheets-Sheet 1
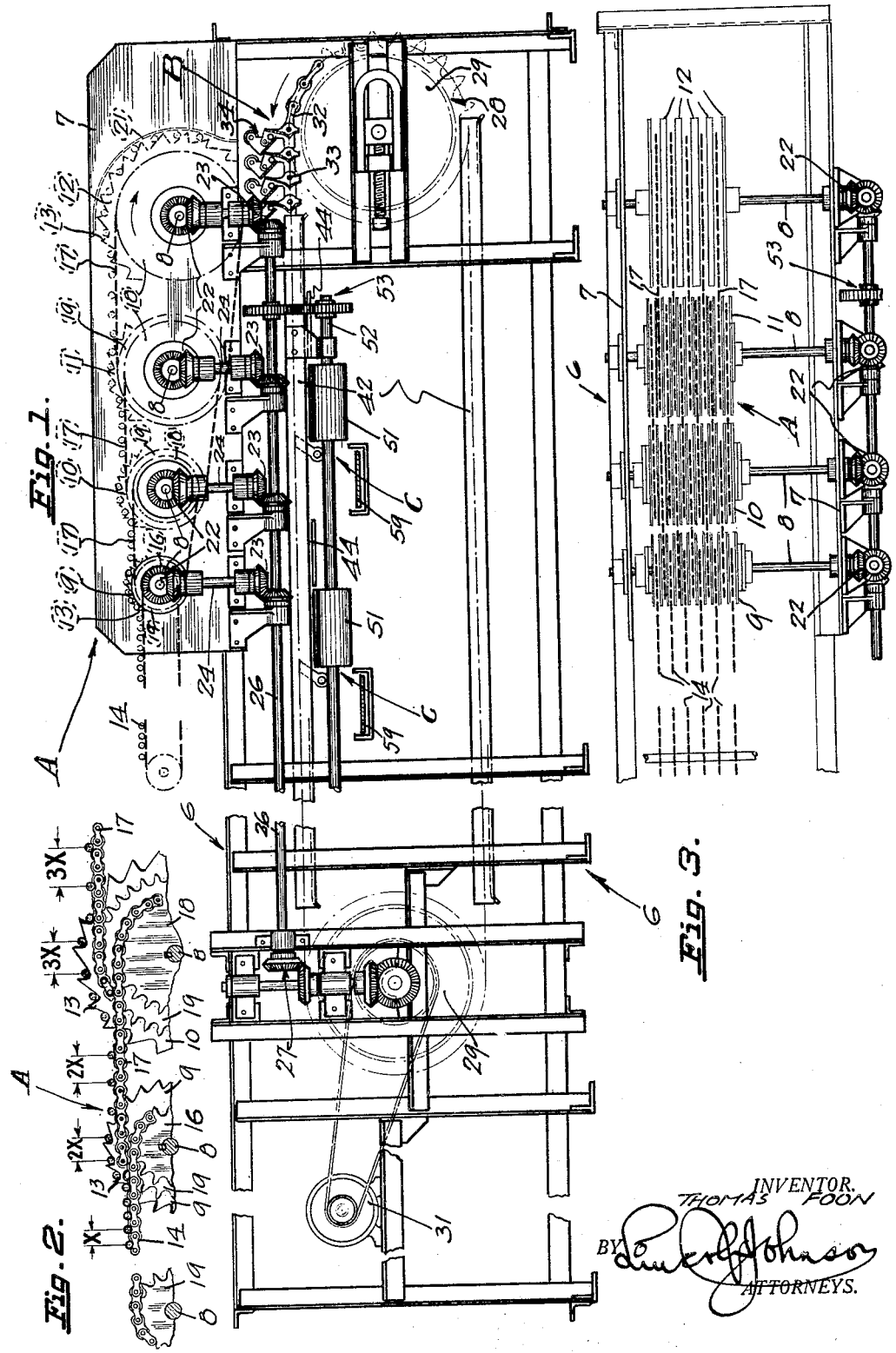

May 16, 1933.　　　T. FOON　　　1,909,462
ASPARAGUS GRADER
Filed July 31, 1929　　2 Sheets-Sheet 2
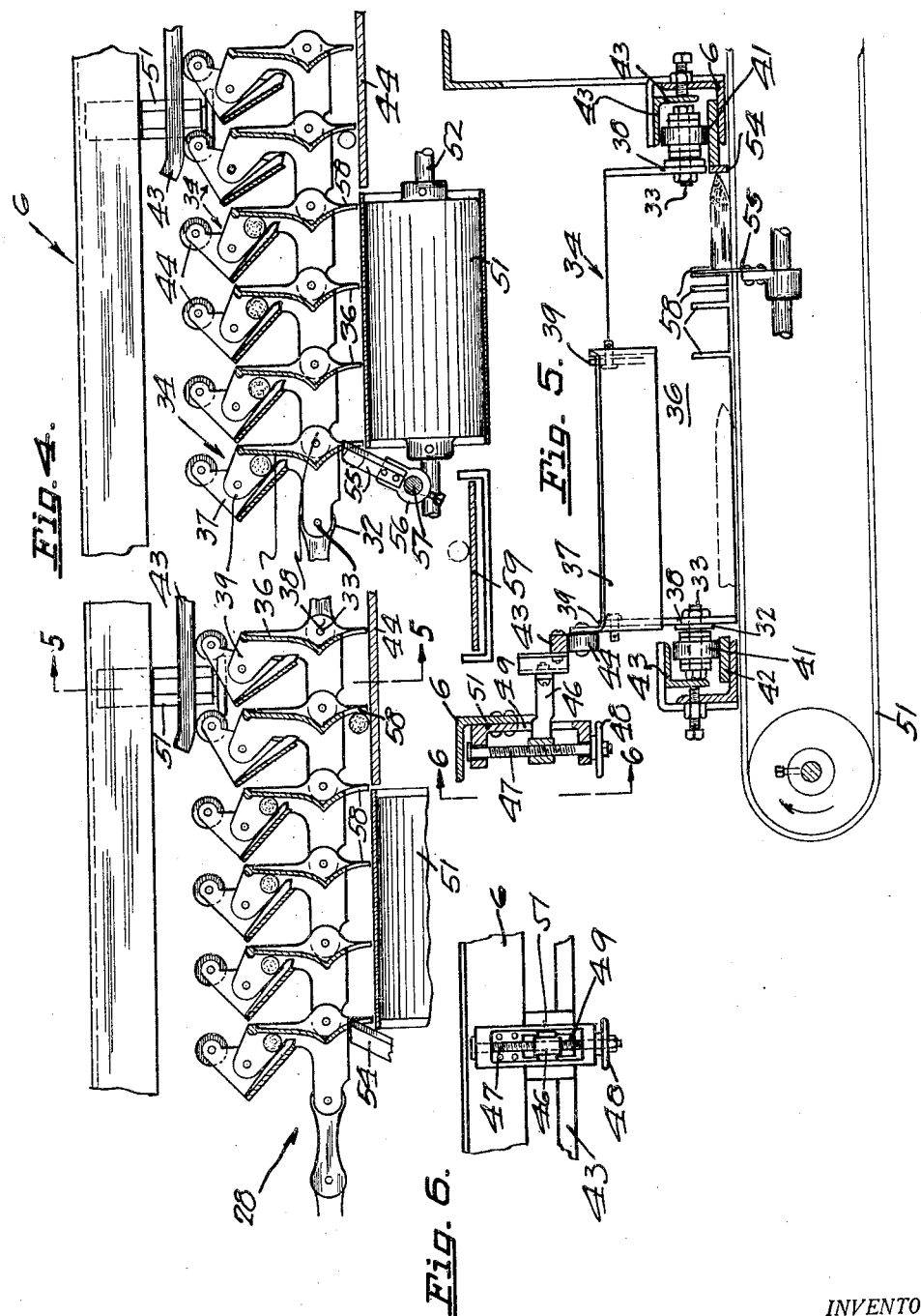
INVENTOR.
THOMAS FOON
BY Lincoln Johnson
ATTORNEYS.

Patented May 16, 1933

1,909,462

UNITED STATES PATENT OFFICE

THOMAS FOON, OF ALVISO, CALIFORNIA

ASPARAGUS GRADER

Application filed July 31, 1929. Serial No. 382,470.

The invention forming the subject matter of the application relates to machines for preparing elongated vegetables, such as asparagus, for canning, in which machine the grading and cutting operations on the vegetable are combined, and performed in a continuous passage of the vegetable thru the machine.

Particularly it is the object of my invention to provide a machine in which the shoots of the asparagus are carried at all times in such a manner that the shoots lie in uniform relation with their tips in the same direction. The grading of the shoots according to thickness is performed in my machine by the use of carriers and their cooperation with suitable mechanisms for releasing the shoots of a certain thickness at a certain point of the machine; means being provided to receive the released shoots and to hold the same in such relation to a cutting mechanism as to allow the sizing of shoots of the same grade to uniform length; intake means being provided on my machine to properly space the individual shoots or asparagus, from each other and to deposit the same into said grading carriers.

Other objects and advantages are to provide a machine for preparing elongated vegetables for canning that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings in which

Fig. 1 is a side elevation of my machine, a central portion thereof being broken away to indicate that the machine may be made of any length desired;

Fig. 2 is a somewhat diagrammatic fragmentary view of the spacing mechanism of my machine;

Fig. 3 is a plan view of the intake end of my machine;

Fig. 4 is a longitudinal sectional view of a portion of my carrier mechanism, illustrating the cooperation thereof with the releasing or grading means and with the cutting mechanism;

Fig. 5 is a sectional end view of the machine, the section being taken on the line 5—5 of Fig. 4; and Fig. 6 is a fragmentary side view of the grading adjusting mechanism, viewing Fig. 5 in the direction of arrows 6—6.

Heretofore in machines of this type, the spacing, grading, carrying and cutting of the shoots or asparagus, were performed as entirely distinct operations, in some instances having a driving mechanism common to all the operations. In other instances the mechanisms to perform the different operations were arranged in series to accomplish a more or less continuous preparation of the shoots for canning. However, in machines heretofore used the mechanisms for each operation on the shoots performed only their respective individual functions in series, independently of each other, without being combined to form a compact unit, and without close cooperation between the different machine elements to achieve the grading and cutting of the shoots accurately, continuously and in a wholly automatic manner.

In my machine the grading and cutting of the shoots or asparagus is performed in the following order. The shoots are deposited in the machine and are gradually and positively spaced from each other to a definite distance. Then each shoot is automatically and positively placed in an individual carrier of a conveyor, whereby it is carried over a plurality of spacedly disposed cutting mechanisms. At each cutting mechanism is a grading mechanism which causes the releasing of shoots of a certain grade thereat. Then the carriers cooperate with the cutting mechanisms for the cutting of each grade of asparagus to a definite length. Thereupon the carriers cause the dropping of the asparagus from the cutting mechanism onto a discharge conveyor by which latter the graded and cut asparagus is delivered from the machine into suitable receptacles. The machine performs the aforementioned operations continuously, successively, and automatically and is driven by motive power common to the entire machine.

In carrying out my invention I make use of a spreader mechanism A, which spaces the shoots from each other and deposits the same one by one onto a conveyor B, the latter grades the shoots and cooperates with cutting mechanisms C, to cut the shoots of each grade to uniform length. All the mechanisms are supported on a frame 6.

The spreader mechanism A is disposed on the top of the frame 6. It is supported particularly on side plates 7. In the plates 7 are journaled shafts 8 carrying spreader wheels 9, 10, 11 and 12 of gradually increasing diameter. Each spreader wheel has the same number of teeth 13 formed on the periphery thereof, thus the spacing between the teeth 13 of each spreader wheel is different. The wheel 9 is the smallest and wheel 12 the largest. The shafts 8 are so disposed as to support the uppermost points of the wheels 9, 10, 11 and 12 in properly adjusted position relatively to each other.

The asparagus is fed to the first spreader 9 by a chain conveyor 14 which is in engagement with a sprocket 16, mounted on and rotated by the shaft 8 of the first spreader wheel 9. The relation of the chain conveyor 14 to the spreader wheel 9 is such as to cause the deposition of the shoots one by one into the teeth 13 of the spreader wheel 9 when they travel above the plane of the conveyor 14. The shoots are carried from one spreader wheel to the next by endless chain conveyors 17. Each endless conveyor 17 is rotated by a sprocket 18, which latter is fixedly mounted on the shaft 8 of the respective spreader wheel onto which the respective conveyor 17 delivers the shoots. The conveyors 17 are in engagement with idler sprockets 19 which latter are rotatably supported on the shaft 8 of the respective spreader wheels from which the respective conveyors 17 receive the shoots. For instance the conveyor 17 between the spreader wheels 9 and 10 is driven by the fixed sprocket 18 rotating with the spreader wheel 10, and is supported on the idler sprocket 19, which is rotatable on and relatively to the shaft 8 of the first spreader wheel 9. On each shaft 8 there are a plurality of spreader wheels of the same size, the respective sprockets, 16, 18 and 19 are mounted on the shafts 8 between the respective spreader wheels. Thus a plurality of parallel conveyors 14 and 17 carry the shoots from one size of spreader wheels to the next. It is to be noted that the feeding and spacing mechanism advances the shoots toward the intake end of the conveyor mechanism B and operates in a direction opposite to the direction of the conveyor movement of mechanism B, whereby the machine is rendered a compact unit.

The successive driving sprockets 18 are of gradually increasing diameter in the same proportion as the difference in the spreader wheel diameters. The idler sprockets 19 are of a slightly larger diameter than the adjacent driving sprockets 18, but they are smaller in diameter than the driving sprockets 18 with which they cooperate to support the respective conveyors 17. The shafts are so arranged as to allow the conveyors 17 to offer a substantially horizontal carrying surface, slightly below the uppermost sections of the respective spreader wheels. The shoots are thus deposited from the first spreader wheel 9, upon the first conveyor 17, whereby they are carried to the second spreader wheel 10, and are received one by one by the teeth 13 of the wheel 10 and so to the successive spreader wheels 11 and 12. The peripheral speed of the larger spreader wheels is higher than the peripheral speed of the smaller spreader wheels. This results in the transfer of the shoots at a higher speed at the successive conveyors. However this increased speed of the successive conveyors 17 causes a larger space of the conveyors 17 to pass between the deposition of the successive shoots thereon, than the spacing on the previous conveyor 17. This in connection with the larger teeth of the same number on the larger wheels will cause the gradual and even spacing of the shoots from each other during their passage from the conveyor 14 thru the spreader wheels 9, 10, 11 and conveyors 17, onto the largest spreader wheel 12. If the original spacing of the shoots was "X" as shown in Fig. 2, then the spacing at the second stage is doubled to "2X", and is enlarged to "3X" on the third stage, and so to the last wheel. Adjacent to the outer section of the circumference of the wheel 12 is a stationary guard 21 mounted on the frame 6, to prevent the falling out of the shoots from the teeth 13 of the wheel 12, when said shoots are carried downwardly onto the conveyor mechanism B. Pins may be provided on conveyors 14 and 17 to maintain the shoots in uniform relation.

The shafts 8 are driven at the same speed by upper and lower sets of gears 22 and 23 respectively, connected to the opposite ends of vertical transmission shafts 24, the latter being mounted on one of the side plates 7. A long power shaft 26 transmits movement from a gearing 27 which in turn is suitably connected to the driving mechanism of the machine. The conveyor and grading mechanism B onto which the shoots are discharged from the wheel 12, comprises an endless double strand conveyor 28, mounted at the opposite ends on the frame 6, on pairs of sprockets 29, one pair of the sprockets being rotated by an electric motor 31, as shown in Fig. 1.

It is to be noted here that the transmission gearing 27 is operatively connected to the shaft of the driving sprocket 29 so as to transmit rotation therefrom to the long shaft 26.

Each strand of the conveyor 28 is constructed of suitable links 32, pivotally attached to each other. Upon the pivots 33 of each pair of opposed links 32 is secured a carrier 34. Each carrier 34 is constructed of a bracket plate 36 and a swivelable bucket 37. The bracket plate 36 has flanges 38 formed on the opposite ends thereof, which are mounted on the respective pivots 33 of the conveyor 28. The plate 36 extends throughout the entire width between the opposite strands of the conveyor 28.

On an upper corner of the plate 36 and also at a point spaced from the corner are lugs 39, extending in the direction of the conveyor movement. Upon said lugs 39 is pivotally supported the bucket 37 in such a manner, that it is urged by its own gravity against the forward face of the plate 36, thus forming an inclosure thereat. The spacing of the carriers 34, and the speed of the conveyor 28 is such that each time, when a shoot is dropped from the spreader wheel 18, a bucket passes below the guard 21 to receive said shoot. In this manner the shoots are dropped one by one from the spreader wheel 18 into the successive carriers 34 as the latter pass below the guard 21. The guard 21 is so shaped as to guide the shoots during their drop from the wheel 18. The shoots are then carried toward the cutting mechanisms C, by the usual movement of the conveyor 28.

In order to positively align and guide the carriers 34 in their movement, each pivot 33 extends outwardly from the strands of the conveyor 28, and has a roller 41 mounted thereon. The rollers 41 roll upon guide bars 42, the latter being supported on the frame 6. There are two such parallel guide bars 42 on each side of the frame 6, for guiding said rollers 41, both on their shoot carrying and on their return movements, respectively on the upper and on lower guide bars 42. The carriers 34 and the conveyor 28 are centered by adjustable side members 43, to prevent lateral and upward springing of the conveyor 28 or of the carriers 34 thereon.

In order to effect the grading of the shoots before the respective carriers 34 reach the cutting mechanisms C, a grading cam 43 is held in position above the carriers 34, ahead of each cutting mechanism C. The outer end of each bucket 37 slopes rearwardly and on the outermost end thereof is rotatably mounted a bucket actuating roller 44, extending sidewise from the bucket 37 in such a manner that it engages the under side of the respective cam 43. By this action the uppermost end of the bucket 37 is depressed, whereby the bucket is swung around its pivot, so that the lower edge of the bucket 37 is moved away from the bracket plate 36. The spacing of the cams 43 from the plane of the conveyor 28 determines the degree of movement of the buckets 37, and the width of the clearance created by said movement at the inner edge of the said buckets. The clearance thus created allows the escapement of shoots of a certain grade from the bucket. Opposite each cam 43 is a stationary table 44 onto which the graded shoots drop thru said clearance by their own gravity.

The cams 43 are supported on cam brackets 46, which latter in turn are threadedly mounted on a vertical threaded rod 47, journaled in the frame 6. On an end of the threaded rod 47 is a hand wheel 48 by means of which the rod 47 may be rotated manually. The cam bracket 46 is guided in a slot 49 of a plate 51 on the frame 6, whereby the cam bracket 46 is prevented from rotation with the threaded rod 47. Thus the rotation of the rod 47 causes the downward or upward adjustment of the cam 43. In this manner the bucket opening is adjusted to any desired thickness. The cam 43 under which the carriers 34 pass first, is so adjusted as to be higher above the carriers 34 then the other cams 43. The successive cams 43 are so adjusted that each cam 43 is at a lower level, or closer to the carrier 34 than the preceding cam 43. While passing under the successive cams 43 the buckets 37 are opened to gradually larger degrees, allowing the escapement of a different grade of shoot at each cam 43.

Opposite each cam 43 is held one of the stationary tables 44 to receive the graded shoots thereon. The afore-described cam adjusting mechanism is clearly illustrated in Figs. 5 and 6, and it effects the adjustment of the machine to any predetermined grading of the shoots.

The bracket plates 36 extend over the tables 44 so as to advance the graded shoots thereon toward the cutting mechanisms C. Each cutting mechanism C comprises an endless cross conveyor 51. All the conveyors 51 are driven by a shaft 52 suitably journaled on the frame 6 and connected to the shaft 26 by a set of transmisssion gears 53, as clearly shown in Fig. 1. To one of the upper guide bars 42, and adjacent to one side of the conveyor 28, are fixedly attached stops 54, extending above each cross conveyor 51, the conveyors 51 are so operated as to carry the shoots deposited thereon toward said stops 54. The bracket plates 36 move the shoots from the respective tables 44 onto the respective cross conveyors 51. The shoots are carried by the latter toward the stops 54, so that the tips of the shoots abut against the respective stop 54. The bracket plates 37 then still further advance the shoots on the respective conveyor 51 toward a cutter blade 55, by which the shoots are cut to a desired length. In order to render the position of the blades 55 adjustable to cut the shoots to different lengths as required, the blade 55 is mounted on a hub member 56, which latter is axially adjustable on a shaft 57, which extends crosswise below the upper path of the conveyor 28, and is suitably supported on the frame 6.

The bracket plates 37 are permitted to pass over the blades 55 because of the provision of slots 58 in said plates 37, to accommodate the blades 55. A plurality of such slots 58 are formed spacedly on each plate 37, and the blades 55 in their different adjusted positions, assume positions aligning with one of the slots 58.

When the shoots are urged against the respective blades 55 by the advancement of the bracket plates 37, they are cut thereby to the desired length. The further travelling of the bracket plates 37 over the blades 55 removes the cut shoots from the respective cross conveyor 51 and causes the same to drop onto a lower cross conveyor 59 by which latter the graded and cut shoots are discharged from the machine. The graded and cut shoots are then collected and treated for canning in the customary manner.

It will be recognized that a particularly compact machine is provided to space the shoots for grading, and to grade and to cut the graded shoots to different sizes required; the machine operates entirely automatically; after the initial adjustments as to grading, the machine does not require any careful setting up or special attention during its operation. The machine combines simplicity and ruggedness of construction, with positive and automatic operation, especially adapting it for its use. The operator of the machine is merely required to feed the shoots or asparagus onto the first intake conveyor of the machine, and to collect the graded and cut shoots at their points of discharge, thus the machine readily lends itself to operation by the labor ordinarily available.

Having thus described this invention what I claim and desire to secure by Letters Patent is:

1. A machine of the character described comprising a conveyor mechanism, a plurality of carriers traveling therewith so as to receive the shoots and advance the same; adjustable means to cause the release of shoots of a predetermined grade from said carriers at the same point of travel; stationary means to receive said graded shoots operating to give the same uniform length; and an element on each carrier travelling over said last means to advance the released and graded shoots on said last means.

2. In a machine of the character described a conveyor mechanism to receive and advance the shoots; a plurality of carriers on said conveyor in which the shoots are received, said carriers being adapted to be opened at a certain point of their travel so as to release the shoots therefrom; means to act upon each carrier at the point of release to open the same to a predetermined degree to allow the release of shoots of a certain grade thereat; means with which the carriers from which the shoots were released cooperate to give the graded shoots uniform length, each of said carriers comprising a bracket plate attached to the conveyor; a pivoted bucket, normally abutting against the bracket plate so as to hold the shoots thereat; and means on the bucket to engage said opening means so as to move the bucket away from the plate thereby to release shoots of a certain grade thereat, said plate being moved along said length giving means to advance the shoots on the latter.

3. In a machine of the character described a conveyor mechanism to receive and advance the shoots; a plurality of carriers on said conveyor in which the shoots are received, said carriers being adapted to be opened at a certain point of their travel so as to release the shoots therefrom; means to act upon each carrier at the point of release to open the same to a predetermined degree to allow the release of shoots of a certain grade thereat; means with which the carriers cooperate to give the graded shoots uniform length, each of said carriers comprising a bracket plate attached to the conveyor; a pivoted bucket, normally abutting against the bracket plate so as to hold the shoots thereat; and means on the bucket to engage said opening means so as to move the bucket away from the plate thereby to release shoots of a certain grade thereat, said bracket plates being adapted to pass over said uniform length giving means so as to advance the released shoots thereto and cause the sizing thereof.

4. In a machine of the character described a traveling carrier to receive and advance the shoots; a plurality of grading elements spacedly disposed in operative relation to the path of the traveling carrier, each element being adapted to cause the release of a certain grade of shoots from the carrier; means at each point of release to give the released shoots of the same grade uniform length, and an element on each carrier to advance the shoots on said length giving means.

5. In a machine of the character described a traveling carrier to receive and advance the shoots; a plurality of adjustable grading elements disposed spacedly from each other in operative relation to said carrier so as to successively release therefrom shoots of different grades at different points of the carrier travel; means at each point of release with which the carriers co-operate to give to the released shoots of the same grade uniform length, and an element on each carrier to advance the shoots on said length giving means.

6. In combination a traveling carrier to receive and advance shoots; comprising a bracket plate and a bucket movably supported thereon; a grading element fixedly held in operative relation to the path of the carrier travel; a grading element held in operative relation to the path of the carrier travel so as to move said bucket thereat to a predetermined degree, thereby to release shoots of a certain grade therefrom; and means to give the graded shoots uniform length; said bracket plate being adapted to advance the released shoots thru said uniform length giving means.

7. In combination a conveyor mechanism, a plurality of carriers thereon to receive and carry shoots; each carrier comprising a bracket plate mounted on the conveyor, a bucket swingably mounted on the bracket plate so as to normally abut against the bracket plate thereby to hold the shoot therein; a plurality of grading elements spacedly held relatively to each other and in operative relation to the path of the carriage travel; means on each bucket to be brought into engagement with the successive grading elements so as to cause the swinging of the respective bucket away from the bracket plate to release shoots of a certain grade from the carrier; the successive grading elements being disposed in such relation to the path of th carrier travel that each element swings the bucket to a larger degree than the preceding element; and means to give the graded shoots uniform length; said bracket plate being adapted to advance the released shoots to said uniform length giving means and to co-operate with the latter while passing thereover.

8. In combination a traveling carrier to receive and advance shoots; grading means to release shoots of certain grades from the carrier; a cross conveyor below the carrier; an abutment in operative relation to the conveyor, shoots released into the conveyor being carried by said conveyor lengthwise and being held with their tips against the abutment; a cutter disposed at one side of the cross conveyor, in the path of the carrier; said carrier being adapted to pass over said conveyor and said cutter so as to advance the released shoots thereto, thereby to cause the cutting of the graded shoots to uniform length.

9. In a machine of the character described a traveling carrier to receive the shoots and to advance the same; grading means held in operative relation to the path of the traveling carrier to cause the release of shoots of a certain grade thereat; means to receive the released shoots and operating to give the same uniform length; spacing means to first receive the shoots and to convey the same in spaced relation to the carrier, said means to give the shoots uniform length comprising a cutting blade, said carrier being adapted to advance the released shoots toward the cutting blade; and means to move and hold the shoots in uniform relation to said cutting blade, when the shoots are advanced toward the cutting blade by the said carrier.

10. In a machine of the character described a traveling carrier to receive the shoots and to advance the same; grading means held in operative relation to the path of the traveling carrier to cause the release of shoots of a certain grade thereat; means to receive the released shoots and operating to give the same uniform length; spacing means to first receive the shoots and to convey the same in spaced relation to the carrier, said grading means comprising a plurality of grading elements spacedly held relatively to each other, said grading elements being so arranged that each element operates to release a different grade of shoots, said means to give the shoots uniform length comprising a cutting blade, said carrier being adapted to advance the released shoots toward the cutting blade; and means to move and hold the shoots in uniform relation to said cutting blade, when the shoots are advanced toward the cutting blade by the said carrier.

11. In a machine of the character described, a traveling carrier to receive the shoots and to advance the same; grading means held in operative relation to the path of the traveling carrier to cause the release of shoots of a certain grade thereat; means to receive the released shoots and operating to give the same uniform length; spacing means to first receive the shoots and to convey the same in spaced relation to the carrier, said means to give the shoots uniform length comprising a table upon which the released shoots drop from the tilted bucket; a cutting blade, said carrier being adapted to pass over said table and said cutting blade, and to advance the graded shoots to said cutting blade; a cross conveyor between the table and the cutting blade, and an abutment against which the cross conveyor moves and holds the graded shoots in uniform relation while said carrier is advancing the shoots toward the cutter blade.

12. In a machine of the character described a traveling carrier to receive the shoots and to advance the same; grading means held in operative relation to the path of the traveling carrier to cause the release of shoots of a certain grade thereat; means to receive the released shoots and operating to give the same uniform length; spacing means to first receive the shoots and to convey the same in spaced relation to the carrier, said grading means comprising a plurality of grading elements spacedly held relatively to each other, said grading elements being so arranged that each element operates to release a different grade of shoots, said means to give the shoots uniform length comprising a table upon which the released shoots drop from the tilted bucket; a cutting blade, said carrier being adapted to pass over said table and said cutting blade, and to advance the graded shoots to said cutting blade; a cross conveyor between the table and the cutting blade, and an abutment against which the cross conveyor moves and holds the graded shoots in uniform relation while said carrier is advancing the shoots toward the cutter blade.

13. In a machine of the character described a traveling carrier to receive the shoots and to advance the same; grading means held in operative relation to the path of the traveling carrier to cause the release of shoots of a certain grade thereat; means to receive the released shoots and operating to give the same uniform length; spacing means to first receive the shoots and to convey the same in spaced relation to the carrier; said traveling carrier comprising a conveyor; a plurality of carrier elements mounted thereon, a bucket movably mounted on each carrier element so as to normally hold the shoots in the carrier; means on the bucket to be brought into operative engagement with the said grading means when the carrier travels past the grading means, so as to move the bucket to a predetermined degree, whereby shoots of a certain grade are released, said grading means comprising a plurality of grading elements spacedly held relatively to each other, said grading elements being so arranged as to tilt the buckets passing thereat to greater degree at each successive element, thereby to release shoots of a certain grade at each cam in an order of gradually increasing shoot thickness, said means to give the shoots uniform length comprising a table upon which the released shoots drop from the tilted bucket; a cutting blade, said carrier being adapted to pass over said table and said cutting blade, and to advance the graded shoots to said cutting blade; a cross conveyor between the table and the cutting blade; and an abutment against which the cross conveyor moves and holds the graded shoots in uniform relation while said carrier is advancing the shoots toward the cutter blade.

In testimony whereof, I have hereunto set my hand at San Francisco, California, this 27th day of July 1929.

THOS. FOON.